US009499142B2

(12) United States Patent
Svensson et al.

(10) Patent No.: US 9,499,142 B2
(45) Date of Patent: Nov. 22, 2016

(54) SYSTEMS AND METHODS FOR WHEEL SLIP CONTROL IN A VEHICLE

(71) Applicant: FORD GLOBAL TECHNOLOGIES, LLC, Dearborn, MI (US)

(72) Inventors: Thomas Svensson, Leichlingen (DE); John P. Joyce, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/713,828

(22) Filed: May 15, 2015

(65) Prior Publication Data

US 2015/0329093 A1 Nov. 19, 2015

(30) Foreign Application Priority Data

May 16, 2014 (DE) .................. 10 2014 209 343

(51) Int. Cl.
*B60T 8/1761* (2006.01)
*B60T 8/172* (2006.01)
*B60T 8/1766* (2006.01)

(52) U.S. Cl.
CPC ........... *B60T 8/17616* (2013.01); *B60T 8/172* (2013.01); *B60T 8/1766* (2013.01); *B60T 2270/14* (2013.01)

(58) Field of Classification Search
CPC .................................. B60T 8/17616
(Continued)

(56) References Cited

U.S. PATENT DOCUMENTS 5,364,176 A * 11/1994 Sawada .................. B60T 8/368
303/113.2
6,164,731 A * 12/2000 Nakazawa ............ B60T 8/4031
303/10
(Continued)

FOREIGN PATENT DOCUMENTS

DE 43 19 865 C1 10/1994
DE 196 38 306 A1 3/1998
(Continued)

OTHER PUBLICATIONS

Office Action dated Dec. 9, 2014 issued in corresponding German Application 10 2014 209 343.0.

*Primary Examiner* — Behrang Badii
*Assistant Examiner* — Michael Berns
(74) *Attorney, Agent, or Firm* — Jones Robb, PLLC; Raymond L. Coppiellie

(57) ABSTRACT

Methods for controlling wheel slip of a motor vehicle include braking the wheel by supplying a first measured quantity of brake fluid from a modulation cylinder to a brake device of the wheel, determining the wheel slip of the wheel, and moving a second measured quantity of brake fluid between the modulation cylinder and the brake device. When the wheel slip is too small or too large, a change in a volume of the brake fluid in the modulation cylinder is measured and a change in a measure of a braking effect is determined. The second measured quantity of brake fluid is determined on the basis of the measured change in the volume of the brake fluid in the modulation cylinder and the change in the measure of the braking effect. Braking systems configured to carry out the methods, as well as vehicles including the braking systems, are further contemplated.

15 Claims, 2 Drawing Sheets

(58) Field of Classification Search
 USPC .......................................................... 701/74
 See application file for complete search history.

(56) References Cited

U.S. PATENT DOCUMENTS

| | | | | |
|---|---|---|---|---|
| 6,652,039 | B1 * | 11/2003 | Shull | B60T 8/404 |
| | | | | 303/113.2 |
| 8,380,417 | B2 * | 2/2013 | Kaster | B60T 8/4275 |
| | | | | 303/113.2 |
| 9,145,119 | B2 * | 9/2015 | Biller | B60T 8/4081 |
| 9,205,821 | B2 * | 12/2015 | Biller | B60T 8/4081 |
| 2015/0025767 | A1 | 1/2015 | Feigel | |
| 2015/0035353 | A1 | 2/2015 | Drumm | |

FOREIGN PATENT DOCUMENTS

| | | |
|---|---|---|
| DE | 199 26 672 A1 | 3/2000 |
| DE | 10 2009 028 542 A1 | 2/2011 |
| DE | 10 2012 222 897 A1 | 8/2013 |
| DE | 10 2013 203 189 A1 | 9/2013 |
| DE | 10 2013 203 594 A1 | 9/2013 |

* cited by examiner

SYSTEMS AND METHODS FOR WHEEL SLIP CONTROL IN A VEHICLE

CROSS REFERENCE TO RELATED APPLICATIONS

This application claims priority to German Application No. 10 2014 209 343.0, filed on May 16, 2014, the contents of which is hereby incorporated by reference in its entirety.

TECHNICAL FIELD

The present disclosure relates to systems and methods of controlling wheel slip of a wheel of a motor vehicle, as well as motor vehicles having such systems.

BACKGROUND

In motor vehicles, driver assistance systems, such as ABS (anti-lock brake system), ESP (electronic stability program) and RSC (Roll Stability Control), can be used to perform automatic braking interventions or modify braking processes initiated by a driver to facilitate safe vehicle behavior. It is therefore possible, for example, for ABS to intervene in situations of emergency braking and to reduce brake pressure requested by the driver to reduce a slip of a wheel, or a plurality of wheels, of a motor vehicle, which enhances the steerability of the motor vehicle during the braking operation.

During an exemplary braking intervention, brake fluid is fed from one or more wheel brakes back into a master cylinder of a braking system. The quantity of brake fluid moved in this process is usually determined on the basis of a defined modeled characteristic curve that describes the mutual relationship between the hydraulic pressure in the brake device and the volume of the brake fluid in the brake device. However, a plurality of iterations is usually necessary by the driver assistance system during the braking intervention to achieve a desired brake pressure. For example, the quantity of brake fluid previously extracted from a brake device for a wheel may have been too large, with the result that, in a subsequent iteration step, brake fluid has to be transferred again from the brake cylinder to the brake device. Subsequently, if the desired brake pressure or desired braking effect is still absent, further iteration steps will follow. These iteration steps disrupt the driving behavior or braking behavior of the motor vehicle and result in increased braking distance. Thus, although braking systems have been effective in providing safe braking and control of a motor vehicle, further improvements may be made to braking systems and methods.

SUMMARY

In accordance with the present disclosure, a method for controlling wheel slip is provided. The method comprises supplying a first measured quantity of brake fluid from a modulation cylinder to a brake device of the wheel, determining the wheel slip of the wheel, and transferring a second measured quantity of brake fluid between the modulation cylinder and the brake device, wherein movement of the second measured quantity of brake fluid is based at least in part on the wheel slip.

In accordance with another aspect of the present disclosure, a braking system for a motor vehicle is provided. The braking system comprises a modulation cylinder configured to provide brake fluid to a brake device of the braking system for a wheel of the motor vehicle, a sensor configured to detect a quantity of brake fluid used by the modulation cylinder, at least one wheel speed sensor, a brake fluid flow control device configured to control the flow of brake fluid from the modulation cylinder to the brake device, and a control unit in communication with the sensor configured to detect the quantity of brake fluid, the wheel speed sensor, and the brake fluid control device. The control unit is configured to control the brake fluid control device to supply a first measured quantity of brake fluid from the modulation cylinder to the brake device to brake the wheel, determine the wheel slip of the wheel based upon output from the at least one wheel speed sensor, measure a change in a volume of the brake fluid in the modulation cylinder based upon output from the sensor configured to detect the quantity of brake fluid used by the modulation cylinder, measure a change in a measure of a braking effect of the braking device, determine a second measured quantity of the brake fluid to flow between the modulation cylinder and the brake device as a function of the measured change in the volume of the brake fluid in the modulation cylinder and the change in the measure of the braking effect, and control the brake fluid control device to flow the second measured quantity of the brake fluid between the modulation cylinder and the brake device.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the present disclosure are explained in detail below using an exemplary embodiment illustrated in the following figures. In the figures.

DESCRIPTION OF THE EMBODIMENTS

Figure 1:
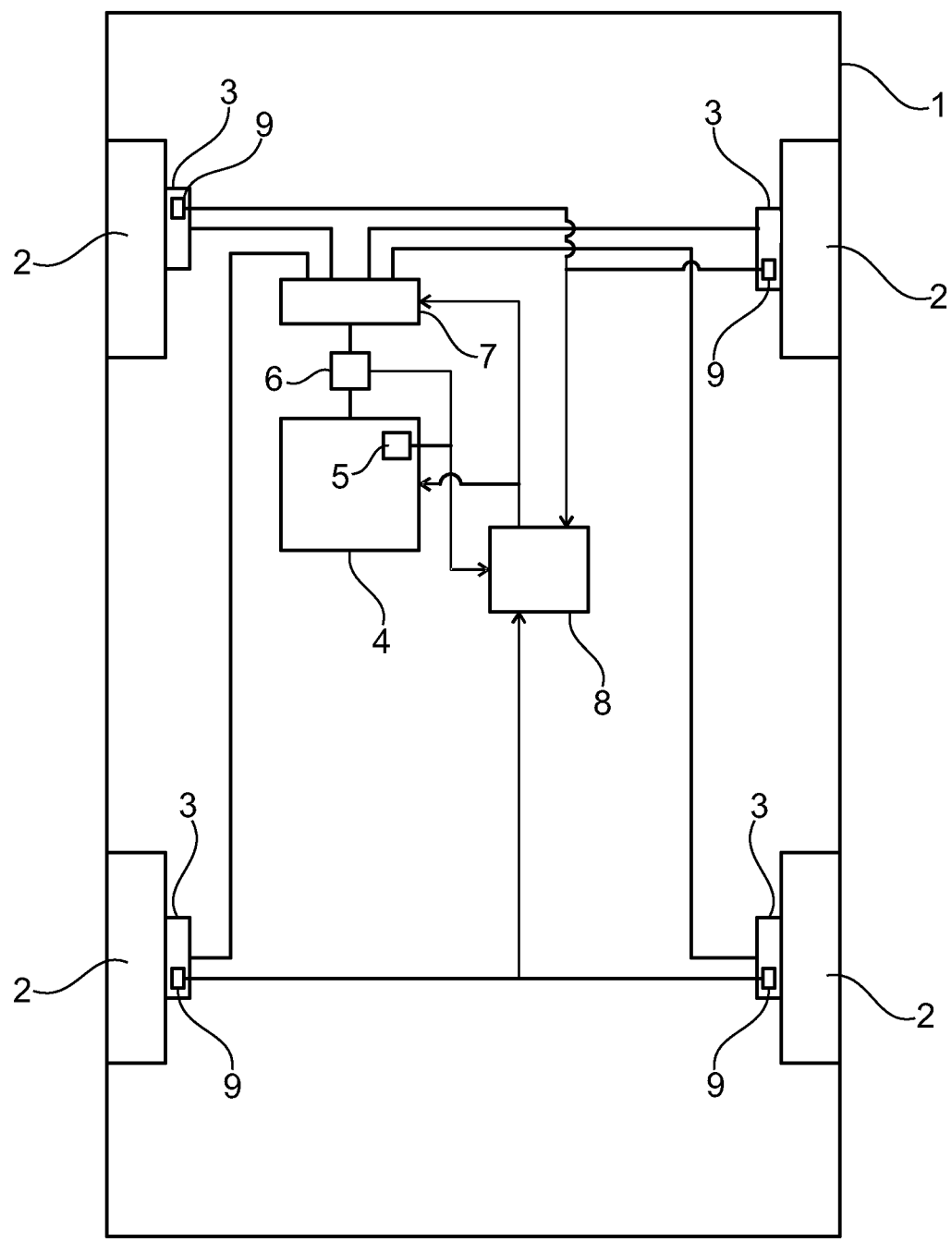
FIG. 1 schematically depicts a hydraulic brake system of a motor vehicle, according to an exemplary embodiment of the present disclosure.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The various exemplary embodiments described herein contemplate systems and methods for controlling wheel slip of a wheel of a motor vehicle. A method of controlling wheel slip may have at least the following steps: braking the wheel by supplying a first quantity of brake fluid from a modulation cylinder (e.g., a source of brake fluid, such as a master cylinder) to a brake device of the wheel, determining the wheel slip of the wheel, and transferring a second quantity of brake fluid between the modulation cylinder and the brake device of the wheel if the wheel slip does not meet a setpoint value. The second quantity of brake fluid may be removed from the brake device to the modulation cylinder or may be supplied from the modulation cylinder to the brake device to correspondingly decrease or increase wheel slip to a desired value. The present disclosure further contemplates braking systems to brake a wheel of a motor vehicle, the system being configured to supply a first quantity of brake fluid from a modulation cylinder to a brake device of the wheel, configured to determine the wheel slip of the wheel, and configured to transfer a second quantity of brake fluid between the modulation cylinder and the brake device of the wheel (e.g., either from the brake device to the modulation cylinder or from the modulation cylinder to the brake device) if the wheel slip does not meet a setpoint value. The present disclosure further contemplates vehicles including such braking systems.

According to an exemplary embodiment, the determination of wheel slip includes measuring a change in a volume of the brake fluid in a modulation cylinder and determining a change in a measure of a braking effect. Therefore, a second quantity of brake fluid to be transferred between a modulation cylinder and a brake device can be determined as a function of the measured change in the volume of the brake fluid in the modulation cylinder and the determined change in the measure of the braking effect. The measure of the braking effect can be, for example, a wheel speed or a brake fluid pressure. A method or control by a braking system can be repeated in one or more iterations, with the first and the second quantities of brake fluid being newly determined in each iteration, according to an exemplary embodiment.

According to an exemplary embodiment, a modulation cylinder is a source of brake fluid that supplies brake fluid to brake devices of wheels of a motor vehicle. The modulation cylinder can be, for example, a master cylinder (e.g., as used in conventional braking systems); a device having an electric motor that enhances a manual pedal force applied to a brake fluid cylinder; a device including a first brake fluid cylinder that is not mechanically coupled to the vehicle brake pedal but actuated by a motor to supply brake fluid during normal operation of a brake system and a second brake fluid cylinder that acts as a brake backup that is mechanically coupled to the brake pedal in emergency situations; or other sources of brake fluid used in braking systems to supply brake fluid to brake devices of wheels.

The volume of the brake fluid in the modulation cylinder can be determined, for example, on an absolute basis or on a relative basis. According to an exemplary embodiment, the volume of brake fluid in a modulation cylinder can be determined based upon measurements of the flow of brake fluid into or out of one or more individual brake devices for the wheels of a vehicle. As a result, a volume of brake fluid contained in the modulation cylinder, which might be otherwise unknown, can be determined by summing the changes in the volume of brake fluid for the individual brake devices with sufficient accuracy. For example, inlet valves for all wheel brake devices except for one brake device, or for the wheels of a single axle, can be closed, the inflow and outflow of brake fluid for the brake device(s) having open inlet valves are measured to determine a change in brake fluid volume for the individual wheel, or wheels for the single axle, and this process is repeated for the brake devices of other wheels, such as for other individual wheels or the wheels of other axles. This process may be utilized because such an embodiment is concerned with the movement of brake fluid between the modulation cylinder and brake devices and making a precise determination of the quantities of brake fluid moved.

The exemplary embodiments described herein have the advantage that a second quantity of brake fluid, which is to be either conducted away from brake devices (e.g., to decrease wheel slip) or conducted from the modulation cylinder to the brake devices (e.g., to increase wheel slip), is to be determined on the basis of a desired change in the braking effect, not characteristic curves. As a result, wheel slip can be controlled more precisely by measuring respective quantities of brake fluid that are moved between the modulation cylinder and brake devices, in comparison to when wheel slip is determined on the basis of a predefined model curve (e.g., characteristic curve) that describes the interrelated behavior of a change in the volume of the brake fluid and a braking effect. In other words, the braking intervention caused by the various exemplary embodiments described herein occurs with a relatively high accuracy, causing a desired wheel slip to be achieved more quickly. The desired wheel slip can be achieved, for example, with fewer control iterations and can be directly set with sufficient accuracy.

The fast control of the wheel slip has the effect that the braking distance of the motor vehicle is minimized or reduced. In the case of a wheel slip control within the scope of an ESP or RSC, the driving stability of the motor vehicle is enhanced, with the result that steering of the motor vehicle is enhanced, such as, for example, when the vehicle turns. Therefore, the various exemplary embodiments described herein increase the safety of the vehicle occupants due to the relatively fast and precise control of the wheel slip. In the case of ESP and RSC, the additional advantage is that when a conventional model curve is used to determine the second quantity of brake fluid, ESP and RSC often operate in conditions where the model curve has large deviations from the actual relationship. Therefore, a reduction in the necessary number of control iterations to provide a desired wheel slip provides an even greater enhancement for ESP and RSC.

The second quantity of brake fluid can be determined, for example, by determining a deviation of the determined wheel slip from a setpoint value, a measured change in the volume of the brake fluid in the modulation cylinder, and a change in a measure of braking effect. According to an exemplary embodiment, the second quantity of brake fluid can therefore be estimated by simple linearization around a working point. For example, a distribution of the first and/or second quantity of brake fluid between a front axle brake and a rear axle brake can be estimated. This is appropriate if the volume of brake fluid which is conducted away from the brake cylinder or fed into the brake cylinder again is distributed among the brakes on the front and rear axles. The value for the change in volume (first or second quantity of brake fluid) which is determined in or on the brake cylinder can be weighted for the estimation of the axle distribution by means of corresponding distribution factors.

As discussed above, the change in volume of braking fluid can be determined for a single braking device by closing the inlet valves for the braking devices of all wheels except for one. This process could be used for one wheel of a front axle and one wheel of a rear axle of a vehicle, with the respective changes in brake fluid volume being doubled to provide the change in brake fluid volume for the wheels of the front axle and the change in brake fluid volume for the wheels of the rear axle. The products, which estimate the respective changes in brake fluid volume for the wheels of the front and rear axles, may be summed to provide a total estimate for the change in volume of brake fluid of a brake system. In another example, a change in volume of brake fluid can be determined for a single wheel, such as a wheel of a front axle or rear axle, and the change in volume of brake fluid multiplied by a function for estimating the change in brake fluid volume for the front axle or a function for estimating the change in brake fluid volume for the rear axle, as appropriate.

The present disclosure contemplates a braking system for a motor vehicle, which can include at least one measuring device configured to measure a volume of a brake fluid in a brake cylinder of the brake device, one or more sensors configured to detect wheel slip, a brake fluid flow control device, and a control unit which is connected to the measuring devices and to the brake fluid flow control device. The control unit is designed here to carry out the methods of the various exemplary embodiments described herein.

FIG. 1 schematically depicts a motor vehicle 1 having a hydraulic braking system, according to an exemplary embodiment. Motor vehicle 1 has wheels 2, on each of which a brake device 3 is arranged. Brake devices 3 can be, for example, drum brakes or disc brakes. The brake devices 3 are connected via hydraulic lines to a modulation cylinder 4 from which brake fluid can pass to the brake devices 3 through the hydraulic lines, such as by activation of a brake pedal by a driver. If the brake pedal is released, a spring can, for example, push the brake pedal back and conduct brake fluid from the brake devices 3 back into the modulation cylinder 4. A brake booster (not shown) can be provided in a known manner.

The distribution of the brake fluid and the respective quantity of brake fluid that flows between the individual brake devices 3 and the modulation cylinder 4 can be predefined, for example, by a brake fluid flow control device, such as, for example, a solenoid valve arrangement 7 or the like. Wheel speed sensors 9 are used to determine the slip of a respective wheel 2, and are provided, for example, on the wheels 2 or brake devices 3. Wheel speed sensors 9 may be used to determine wheel slip, for example, by measuring a respective wheel speed of a wheel 2, such as, for example, using control unit 8 to determine wheel slip based upon the detected wheel speed. One of ordinary skill in the art would be familiar with the basic functioning of ABS, ESP, and RCS, and therefore additional details of ABS, ESP, and RCE will be not provided in the following description.

Modulation cylinder 4 is equipped with a pressure sensor 5 that measures the pressure of the brake fluid in the modulation cylinder 4, according to an exemplary embodiment. Furthermore, a flow quantity sensor 6 is provided that measures the quantity of the brake fluid used by the modulation cylinder 4. For example, flow quantity sensor 6 is configured to detect the quantity of brake fluid flowing into the modulation cylinder 4 and out of the brake cylinder 4 (e.g., between modulation cylinder 4 and brake devices 3). Therefore, the volume of the brake fluid contained in the modulation cylinder 4 can be determined, such as, for example, by the control unit 8 based upon the quantities detected by sensor 6.

A control unit 8 is operatively connected to the various components of the hydraulic brake device, such as, for example, to the wheel speed sensors 9, the pressure sensor 5 and the flow quantity sensor 6. The control unit 8 can control a wheel slip of a wheel 2, such as during the execution of an ABS, ESP or RCS process, in that control unit 8 controls supply of brake fluid between a brake device 3 of the wheel 2 and the modulation cylinder 4, wherein the respectively flowing quantity of brake fluid determines the degree of the braking intervention and wheel slip, such as to increase or decrease wheel slip to a desired value.

The configuration of the control unit 8 is subject to a variety of implementation-specific variations. For example, in some embodiments, the functions described in reference to the control unit 8 may be performed across multiple control units or among multiple components of a single controller. Further, the control unit 8 may include one or more structural components (e.g., microprocessors) that provide the function of a controller. Any controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system or controller to operate the logic or portions of the logic presented in the methods disclosed herein. For example, in certain embodiments, the controller may include computer code disposed on a computer-readable storage medium or a process controller that includes such a computer-readable storage medium. The computer code may include instructions, for example, for carrying out the processes of the various exemplary embodiments described herein.

According to an exemplary embodiment, control unit 8 can determine the change in the pressure in the hydraulic brake device, which is in reaction to the respectively flowing quantities of brake fluid between modulation cylinder 4 and brake devices 3, as a measure of a change in braking effect, on the basis of the measured values of pressure sensor 5 and flow quantity sensor 6. Based on the relationship between changes in quantity of brake fluid and changes in brake fluid pressure, control unit 8 can accurately define quantities of brake fluid (e.g., a second quantity of brake fluid) needed for a braking intervention. For example, control unit 8 may be configured to determine the second quantity of brake fluid (e.g., to correct wheel slip) to move between the brake device 3 and the modulation cylinder 4 based upon, for example, functions, look up tables, or other data stored in an electronic memory (not shown) accessible by control unit 8. According to another exemplary embodiment, control unit 8 can determine the change in the wheel speed of wheels 2, which is in reaction to the respectively flowing quantities of brake fluid between modulation cylinder 4 and brake devices 3, as a measure of a change in braking effect, based upon wheel speeds detected by wheel slip sensors 9.

During use of a motor vehicle, a relationship between changes in the volume of brake fluid and a change in a measure of a braking effect may change due to a variety of factors, such as, for example, changes in running clearance of a brake device (e.g., clearance between brake disc and brake pad), the occurrence of piston knockback, changes in pad compressibility (e.g., due to temperature), taper wear, pad wear, and other factors familiar to one having ordinary skill in the art. Changes in the relationship between the change in volume of brake fluid to the change in measure of braking effect (as measured, for example, via wheel speed or brake pressure), create a deviation in the volume of brake fluid needed to be supplied to, or from, a brake device to achieve a desired wheel slip. For example, too great a volume of brake fluid may be removed from a brake device for a wheel during a dump phase to recover wheel speed for ABS, causing additional control iterations to increase brake fluid pressure to control braking and wheel slip. Further, the section of a characteristic curve at which RSC and ESC operate tends to experience the greatest amount of deviation between the change in volume of brake fluid to the change in measure of braking effect. In addition, deviations between a volume needed to achieve a desired wheel slip and the actual displaced brake fluid volume tends to increase during a stop because control based upon a characteristic curve becomes less accurate, which can cause an increase in stopping distance.

In view of the above changes, control unit 8 may be configured to adapt to changes in the relationship between changes in the volume of brake fluid and a change in a measure of a braking effect by using stored data values, according to an exemplary embodiment. According to an exemplary embodiment, a measured change in the volume of the brake fluid in a modulation cylinder and a measured change in the measure of the braking effect (e.g., change in brake fluid pressure or wheel speed) are stored as data values, such as in an electronic memory accessible by control unit 8. The stored data values may be updated regularly, such as during subsequent braking events and/or control iterations. The stored data values can be used directly instead of a conventional model curve for control methods, such as ABS, ESP or RSC. However, the stored data values provide enhanced control because the stored data values always include values adapted to the current operating conditions. As a result, changes in properties of the brake fluid, such as, for example, temperature, composition, or filling quantity, are taken into account automatically by referencing stored data values that indicate the changes over time. Initial determination of the stored data values can be performed individually for a specific motor vehicle during its production or can be performed uniformly for the type or model of motor vehicle. The stored data values can then be updated, for example, during each braking process by the measurements performed during the process.

According to an exemplary embodiment, a first quantity of brake fluid supplied from modulation cylinder 4 to brake devices 3 is determined as a function of the stored data values. This is appropriate, in particular, in the case of braking interventions which are not initiated by the driver, such as, for example, braking via ESP or RSC methods. Determining the first quantity of brake fluid in this manner results in more precise and therefore faster control of wheel slip. If the first quantity of brake fluid is repeatedly determined in this manner over a plurality of control iterations, the first quantities of brake fluid that are respectively determined in subsequent iterations can be determined as a function of the stored data values within the scope of an ABS method, such as during emergency braking. A second quantity of brake fluid to be transferred between modulation cylinder 4 and brake devices 3 (e.g., to increase or decrease wheel slip) may also be determined on the basis of the stored data values, according to an exemplary embodiment.

Figure 2:
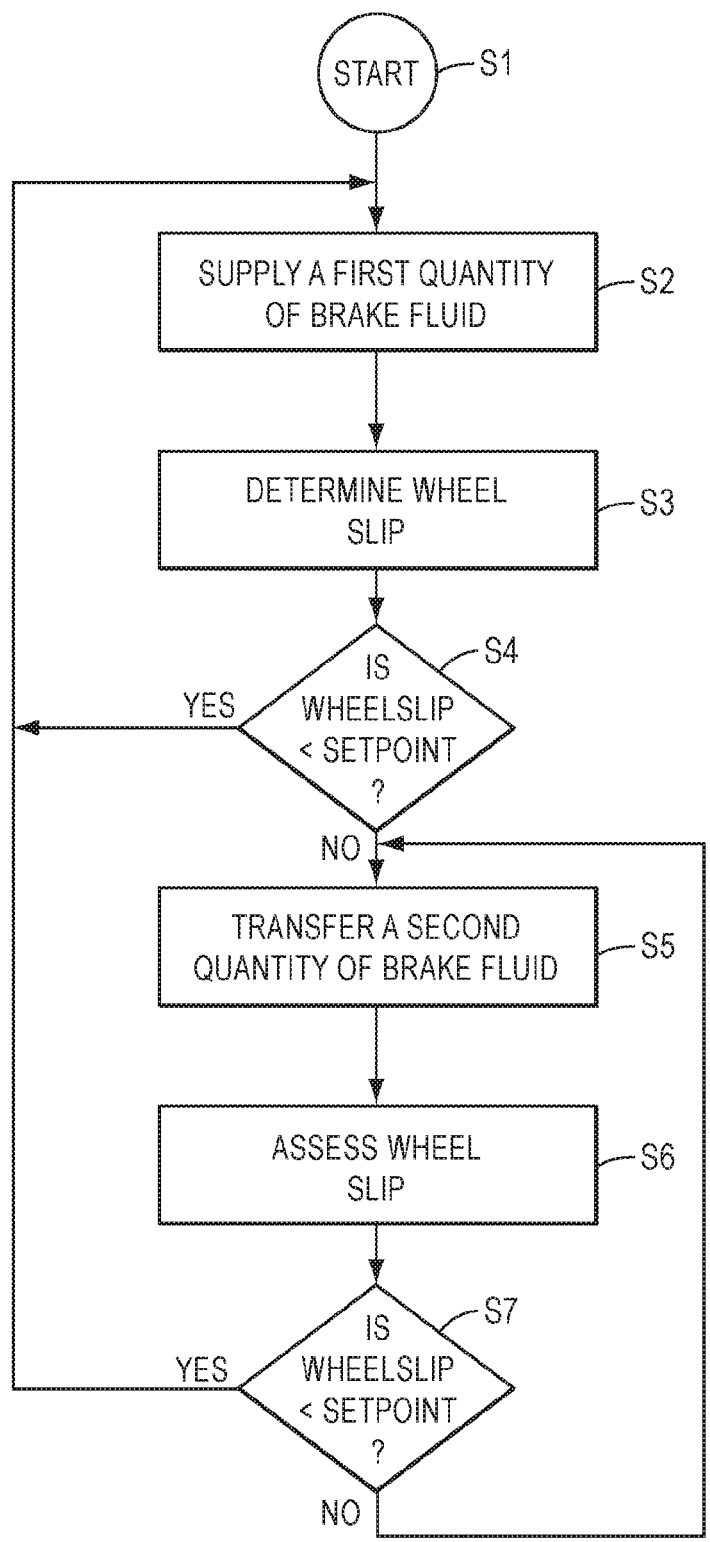
FIG. 2 depicts a method of controlling slip of a wheel of a motor vehicle, according to an exemplary embodiment of the present disclosure.

Turning to FIG. 2, a flowchart is shown for a method of controlling wheel slip, according to an exemplary embodiment. The method for controlling a wheel slip of a wheel begins in step S1, at which braking is initiated, and continues with step S2 in which the wheel is braked by supplying a first quantity of brake fluid to the brake device of the wheel from a modulation cylinder. The method contemplates braking interventions, which may have been considered necessary, for example, within the scope of an ABS, ESP or RCS program. While the first quantity of brake fluid flows from the brake cylinder into the brake, the flowing quantity is measured, such as via sensor 6, and at the same time the change in a measure of braking effect is observed (e.g., a change in pressure in the brake cylinder or wheel speed).

In a following step S3, the wheel slip of the wheel is determined, which can be done, for example, by determining the wheel speed and comparing the wheel speed with a vehicle speed to determine if the current wheel slip is at a desired amount. For example, the determined wheel slip is compared with a setpoint value, or range of values, in step S4. For example, in accordance with one exemplary embodiment, the desired amount of wheel slip may be between about 10%-about 20%. If the wheel slip is too great, the process continues with step S5. Otherwise, the process can branch back to step S2 in order to allow even more brake fluid to flow from the brake cylinder into the brake. In the exemplary embodiment described above, if the wheel slip is between about 10%-about 20%, the decision would be made to keep the amount of fluid in the brake substantially constant, such that there would be substantially no fluid flow into or out of the brake. Thus, the process continues for the duration of the braking intervention, a wheel slip assessment being made after each decision (i.e., decisions to conduct fluid to the brake, to remove fluid from the brake, and/or to hold the fluid in the brake substantially constant). Of course, as those of skill in the art will understand, other factors may impact the decision as to whether the wheel slip is at a desired amount, such as acceleration, history of the wheel slip/speed behavior, etc.

In step S5, brake fluid (e.g., a second quantity of brake fluid) is conducted back from the brake device to the modulation cylinder in order to reduce the wheel slip, such as to facilitate steering of the motor vehicle. The quantity of brake fluid extracted from the brake device may be determined in the modulation cylinder in reaction to the flowing brake fluid on the basis of a change in a measure of a braking effect, such as, for example, a measured change in brake fluid pressure or a change in wheel speed. As a result, a desired value for the wheel slip can be quickly reached in comparison to systems using a predetermined model curve. In addition, a control unit 8 may access stored data values of pressure and volume from preceding executions of the steps S2 and S5 when determining quantities of brake fluid to be used in the method.

The process continues with step S6, in which the effect on the wheel slip of the wheel of the previous decision (i.e., to conduct fluid to the brake, to remove fluid from the brake, to hold the fluid in the brake substantially constant) is assessed by a corresponding measurement (e.g., wheel speed sensor 9). Wheel slip assessment is made after each decision. If the wheel slip is lower than the setpoint value, the process returns to step S2 for another control iteration in which brake fluid is conducted from the modulation cylinder to the brake device to increase the braking effect of the brake and increase wheel slip. Otherwise, the process can return back to step S5 to conduct even more brake fluid from the brake device back to the modulation cylinder. The method can be continued up to termination of the intervention or of the braking process, at which point the method may be terminated. Thus, the present teachings provide the ability for a braking system to stay near the optimum wheel slip by more accurately modulating wheel slip and provides a more robust variation of the braking versus fluid relationship.

The various exemplary embodiments described herein have the advantage that the quantity of brake fluid flowing in step S5 and, if appropriate, in step S2, between the brake cylinder and the brake device to achieve a specific wheel slip, such as during the execution of an ABS, ESP or RCS method, can be determined more precisely. As a result, the aimed-at wheel slip can be set in a smaller number of iterations and the braking distance of the motor vehicle can be shortened and/or the driving stability of the motor vehicle can be improved.

Further modifications and alternative embodiments will be apparent to those of ordinary skill in the art in view of the disclosure herein. For example, the systems and the methods may include additional components or steps that were omitted from the diagrams and description for clarity of operation. It should be noted that the features set out individually in the present disclosure can be combined with each other in any technically advantageous manner and provide other embodiments. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

What is claimed:

1. A method for controlling wheel slip in a motor vehicle, comprising:
   supplying a first measured quantity of brake fluid from a modulation cylinder to a brake device of a wheel;
   determining the wheel slip of the wheel; and
   transferring a second measured quantity of brake fluid between the modulation cylinder and the brake device, wherein movement of the second measured quantity of brake fluid is based at least in part on the determined wheel slip.

2. The method of claim 1, further comprising:
   after supplying the first measured quantity of brake fluid, measuring a change in a volume of the brake fluid in the modulation cylinder and determining a change in a measure of a braking effect; and
   determining the second measured quantity of brake fluid as a function of the measured change in the volume of the brake fluid in the modulation cylinder and the change in the measure of the braking effect.

3. The method of claim 2, wherein the measure of the braking effect is based on a wheel speed of the wheel or a brake fluid pressure.

4. The method of claim 2, wherein data values for the measured change in the volume of the brake fluid in the modulation cylinder and for the determined change in the measure of the braking effect are stored, wherein the stored data values are updated regularly.

5. The method of claim 4, wherein the first measured quantity of brake fluid supplied from the modulation cylinder to the brake device is determined as a function of the stored data values.

6. The method of claim 1, wherein an axial distribution of at least one of the first and second measured quantities of the brake fluid between a front axle brake device and a rear axle brake device is estimated.

7. The method of claim 1, wherein supplying the first measured quantity of brake fluid from the modulation cylinder to the brake device comprises supplying the first measured quantity of brake fluid from a master cylinder to the brake device, and
   wherein transferring the second measured quantity of brake fluid between the modulation cylinder to the brake device comprises transferring the second measured quantity of brake fluid between the master cylinder to the brake device.

8. A braking system for a motor vehicle, comprising:
   a modulation cylinder configured to provide brake fluid to a brake device of the braking system for a wheel of the motor vehicle;
   a sensor configured to detect a quantity of brake fluid used by the modulation cylinder;
   at least one wheel speed sensor;
   a brake fluid flow control device configured to control the flow of brake fluid from the modulation cylinder to the brake device; and
   a control unit in communication with the sensor configured to detect the quantity of brake fluid, the wheel speed sensor, and the brake fluid control device, wherein the control unit is configured to:
      control the brake fluid control device to supply a first measured quantity of brake fluid from the modulation cylinder to the brake device to brake the wheel;

determine a wheel slip of the wheel based upon output from the at least one wheel speed sensor;

measure a change in a volume of the brake fluid in the modulation cylinder based upon output from the sensor configured to detect the quantity of brake fluid used by the modulation cylinder;

measure a change in a measure of a braking effect of the braking brake device;

determine a second measured quantity of the brake fluid to flow between the modulation cylinder and the brake device as a function of the measured change in the volume of the brake fluid in the modulation cylinder and the change in the measure of the braking effect; and control the brake fluid control device to flow the second measured quantity of the brake fluid between the modulation cylinder and the brake device.

9. The braking system of claim 8, wherein the control unit is configured to measure the change in the measure of the braking effect of the braking device based on a wheel speed of the wheel as detected by the at least one wheel speed sensor.

10. The braking system of claim 8, further comprising a pressure sensor configured to measure a pressure of the brake fluid in the modulation cylinder, wherein the control unit is configured to measure the change in the measure of the braking effect of the braking device based on the brake fluid pressure detected by the pressure sensor.

11. The braking system of claim 8, wherein the control unit is configured to store data values for the change in the volume of the brake fluid in the modulation cylinder and for the change in the measure of the braking effect.

12. The braking system of claim 11, wherein the control unit is configured to determine the first quantity of brake fluid as a function of the stored data values.

13. The braking system of claim 8, wherein the control unit is configured to estimate an axial distribution of at least one of the first and second quantity of the brake fluid between a front axle brake device and a rear axle brake device.

14. The braking system of claim 8, wherein the braking system is operatively coupled to at least one wheel of a motor vehicle.

15. The system of claim 8, wherein the modulation cylinder comprises a master cylinder.

* * * * *